(12) United States Patent
Uhm et al.

(10) Patent No.: US 6,620,394 B2
(45) Date of Patent: Sep. 16, 2003

(54) EMISSION CONTROL FOR PERFLUOROCOMPOUND GASES BY MICROWAVE PLASMA TORCH

(75) Inventors: Han Sup Uhm, 11613 Swains Lock Ter., Potomac, MD (US) 20854; Yong C. Hong, Inchon (KR); Ho-Jun Kang, Seoul (KR)

(73) Assignee: Han Sup Uhm, Potomac, MD (US)

( * ) Notice: Subject to any disclaimer, the term of this patent is extended or adjusted under 35 U.S.C. 154(b) by 292 days.

(21) Appl. No.: 09/880,885

(22) Filed: Jun. 15, 2001

(65) Prior Publication Data
US 2003/0000823 A1 Jan. 2, 2003

(51) Int. Cl.[7] .................................................. A62D 3/00
(52) U.S. Cl. ..................... 423/240 R; 588/212; 588/248
(58) Field of Search .......................... 423/240 R, 245.1, 423/403, 412; 588/212, 210, 248; 427/575

(56) References Cited

U.S. PATENT DOCUMENTS 6,362,449 B1 * 3/2002 Hadidi et al. .......... 219/121.36

* cited by examiner

Primary Examiner—Stanley S. Silverman
Assistant Examiner—Edward M. Johnson

(57) ABSTRACT

The surface cleaning of various components of high-tech devices, including computers and/or semiconductors, is performed during manufacturing. This surface cleaning is performed within a reduced pressure chamber by making use of perifluorocompound industrial gases, which eventually contaminate the atmosphere. These contaminant gases are emitted with nitrogen gas, which is used in operation of a dry pump. Under certain conditions, microwave radiation generates an atmospheric plasma torch. This plasma-torch device is attached to the vacuum pump, which emits the nitrogen gas with contaminants. The oxidation mechanism in the torch flames eliminates these contaminants. Additional reaction gases are mixed with the waste gas to improve efficiency of the contaminant elimination.

10 Claims, 6 Drawing Sheets

EMISSION CONTROL FOR PERFLUOROCOMPOUND GASES BY MICROWAVE PLASMA TORCH

Reference Cited as of interest: U.S. Patent Documents

| 5,137,701 | Aug. 1992 | Mundt |
| 5,468,356 | Nov. 1995 | Uhm |
| 5,505,909 | Apr. 1996 | Dummersdorf et al. |
| 5,830,328 | Nov. 1998 | Uhm |

FIELD OF THE INVENTION

The present invention relates generally to the elimination of perfluorocompound (PFC) contaminants released with nitrogen gas from a manufacturing chamber through a vacuum pump. The contaminants are eliminated by their exposure to flames of the microwave plasma torch.

BACKGROUND OF THE INVENTION

PFCs have been widely used in the semiconductor industry for various reasons. These gases have a long atmospheric lifetime. In addition, they have a high global-warming potential because of their intensive absorption of infrared radiation. If the PFC emission continues as it is, they will stay in the atmosphere for a long time, causing the global warming for hundreds to thousand years. Moreover, these gases might have other unknown environmental effects in the future. However, the PFC use in the semiconductor industry has been significantly increased in recent years. In this context, there are international efforts to reduce the emission of PFCs, Hydrogen-containing Fluorocarbons (HFCs) and $SF_6$. For example, the Kyoto Protocol declared the need for significant reduction of the rate of the global-warming gas emission into the atmosphere. The Environmental Protection Agency (EPA) and the semiconductor manufacturing companies signed the Memorandum of Understanding (MOU) in March 1996 in an effort to reduce PFC emission. Therefore, the PFC emission is tightly regulated nowadays. There are four generally acceptable approaches to the reduction of PFC emission. They are the substitution, process optimization, recovery and recycling, and the abatement. Although some alternative chemicals like $C_3F_8$ and $NF_6$ are promising as substitutes. They may also have the global warming potential and may result in generation of PFC by-product. Optimization of cleaning and etching processes has made some progress in recent years. But, this optimization has a fundamental limitation. Recycling and recovery of PFCs from the effluent gas may be desirable. But, the current recovery technologies are not economical.

Plasma remediation of the gas emission is an attractive abatement method. A typical plasma abatement device consists of a reactor chamber, in which plasmas are generated by either radio frequency (RF) power source or microwave radiation. The low-pressure plasma abatement system operated by the RF source is directly connected to the semiconductor process line. The coexistence of the low-pressure abatement system with the vacuum process line introduces several troublesome complications in the semiconductor industry. On the other hand, the microwave plasma torch is operated at the atmospheric pressure and is attached to the exit of the vacuum pump operated by the nitrogen gas. The microwave torch abatement system is completely isolated from the semiconductor process line. Moreover, the present invention is compact enough to be integrated with and attached to the dry pump.

Pollution control with respect to contaminated air as a carrier gas, was proposed in U.S. Pat. No. 5,468,356 issued to Uhm, one of the present inventors, on Nov. 21, 1995. In that invention, contaminated air is exposed to microwave-generated plasma for oxidation by atomic oxygen without bulk heating within a simple cylindrical waveguide cavity under room temperature. Further, such plasma is generated within the cavity by introduction of high-power microwave radiation passing through a weak electric field to achieve air purification despite low electron energy. Pollution control with respect to contaminated air as a hot carrier gas, was proposed in U.S. Pat. No. 5,830,328 issued to Uhm, one of the present inventors, on Nov. 3, 1998. The plasma generated in a hot gas like the discharge gas from a combustion engine or like the discharge gas from an incinerator may oxidize the contaminants, purifying the discharge air.

It is therefore an important object of the present invention to enhance the electric field strength of the microwave radiation, in order to achieve elimination of PFC contaminants in a carrier gas by exposure to a plasma torch generated by concentration of the microwave on a small spot.

An additional object is overcome difficulties heretofore experienced in achieving complete elimination of the PFC contaminants by oxidation with a plasma torch.

SUMMARY OF THE INVENTION

The present invention is a device for elimination of PFC contaminants discharged from industrial applications. The PFC gases used in the industrial cleaning of high-tech components cause air contamination, including global warming and upper atmospheric pollution. These gases are among the most important global warming agents because they remain in the atmosphere for a long time. The PFC gases used in the cleaning process are chemically stable and therefore difficult to destroy. High electric field strength and high-energy electrons provided by the plasma torch are needed to eliminate the PFC gases.

The present invention is directed to a magnetrons used in home microwave ovens. These magnetrons are inexpensive, commercially abundant and compact. They are operated at a frequency of 2.45 GHz and their power is in the range of 0.6–1.4 kW. Intensity of the microwaves with a frequency of 2.45 GHz from a magnetron increases at discharge tube. These intense microwaves at the discharge tube induce an intense electric field, initiating electrical breakdown in the emission gas containing the PFC contaminants. The plasma torch generated by the electrical breakdown due to the microwave electric field eliminates the PFC contaminants by oxidation and by molecular breakdown. The atmospheric plasma abatement system is suitable for semiconductor cleaning process lines at a handling rate of at least 10 liters per minute of waste gases without vacuum pump assistance. To enhance efficiency of the PFC contaminant elimination, additional reactive gases are mixed with the waste gas which is treated in the plasma reaction chamber, decomposing the perfluorocompounds. Destruction efficiency of the tetrafluoromethane ($CF_4$) is experimentally measured by two analytical equipment's.

BRIEF DESCRIPTION OF DRAWINGS

A more complete appreciation of the invention and many of its attendant advantages will be aided by reference to the following detailed description in connection with the accompanying drawings.

DETAILED DESCRIPTION OF PREFERRED EMBODIMENTS

The present invention is the device for the destruction of PFCs used in the semiconductor industrial processing and the scheme of effective abatement of PFCs by means of mixing the waste gas with additive gases.

Figure 1:
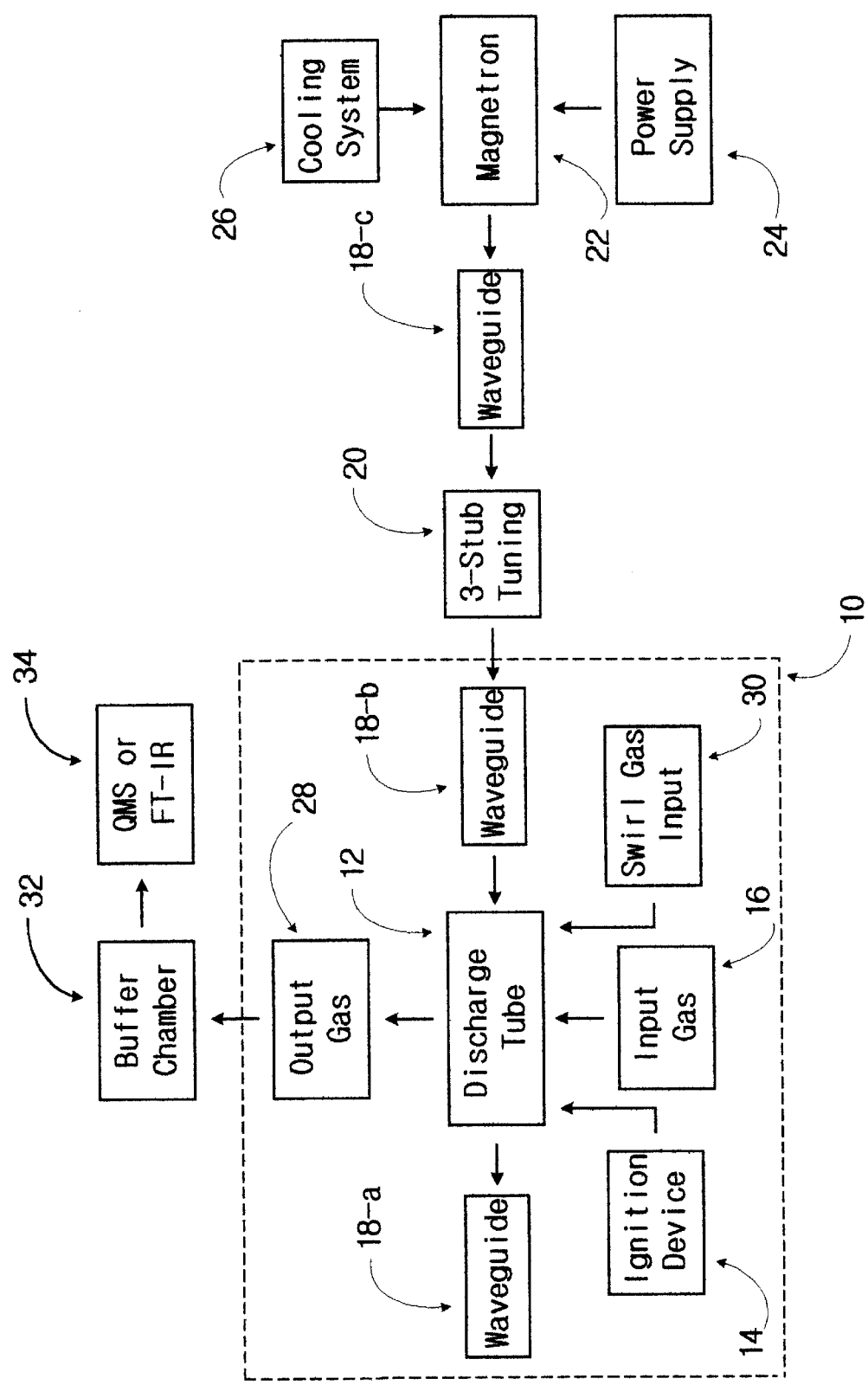
FIG. 1 is a block diagram illustrating the process of the present invention.

Referring now to the drawing in details, FIG. 1 diagrams the reaction chamber system (10) of the present invention wherein the contaminated gas (16) emitted from industrial applications enters the discharge tube (12). The discharge tube (12) is made of an insulating dielectric material such as quartz or a ceramic material. According to the experimental results with various quartz size, it is found that the most suitable plasma generation accomplished when the inner diameter of the quartz tube with thickness 1.5 mm is in the range of 22–27 mm for the microwave frequency of 2.45 GHz. The diameter of a typical plasma-torch flame is about 20 mm. The flame size does not increase even if the internal diameter of the quartz tube increases. The reaction chamber system (10) will be further discussed later, in connection with FIG. 3.

The power supply (24), consisted of full-wave voltage double circuit, provides the electrical power to the magnetron (22) which generates the microwave radiation and which is cooled by a cooling system (26). The cooling system (26) must be capable of delivering at least 1000-liters-per-minute cooling air. The magnetron (22) must be sufficiently cooled, because the magnetron (22) efficiency is very sensitive to the temperature. The generated microwave radiation from the magnetron (22) is guided through the waveguide (18-c), passes through the three-stub tuning device (20), and enters the discharge tube (12) through the waveguide (18-b). The magnetron (22) in the present invention is the low-power 2.45 GHz microwave source used in a typical home microwave oven. The magnetrons used mostly in this invention are the model number of 2M257 manufactured by LG electronics, the model number of 2M218 by Daewoo electronics, and the model number of OM75S by Samsung electronics in Korea. Some of the microwave radiation in the discharge tube (12) goes forward to the end of the waveguide (18-a) and is reflected back to the discharge tube (12). The electric field induced by the microwave radiation in the discharge tube (12) can be maximized by adjusting the three-stub tuning device (20). The ignition device (14) with its terminal electrodes inside the discharge tube (12) is fired to initiate plasma generation inside the discharge tube (12). The plasma torch in the discharge tube (12) is ignited by the combined action of the ignition device (14) and the electrical power provided by the microwave radiation.

The torch flame in the discharge tube is stabilized by the swirl gas input (30). The swirl gas enters the discharge tube sideways creating a vortex inside the discharge tube, stabilizing the torch flame and protecting the discharge tube wall, made of quartz tube, from heat emitted by the flame of 5000 degree Celsius. The swirl gas plays important roles in the thermal insulation of the discharge tube (12) and the stabilization of the plasma torch flame. All the contaminants in the input gas (16) pass through the torch flame and are oxidized by exposure to the plasma torch. The exiting output gas (28) is free of the PFC contaminants. Two analytical equipment's (34) are used to measure the destruction efficiency of contaminants in input gas (16) and to identify the by-products in the output gas (28). The output gas (28) is collected in the buffer chamber (32) where the samples of the output gas are sent to the sample analyzers in the analytical equipment's (34).

Figure 2:
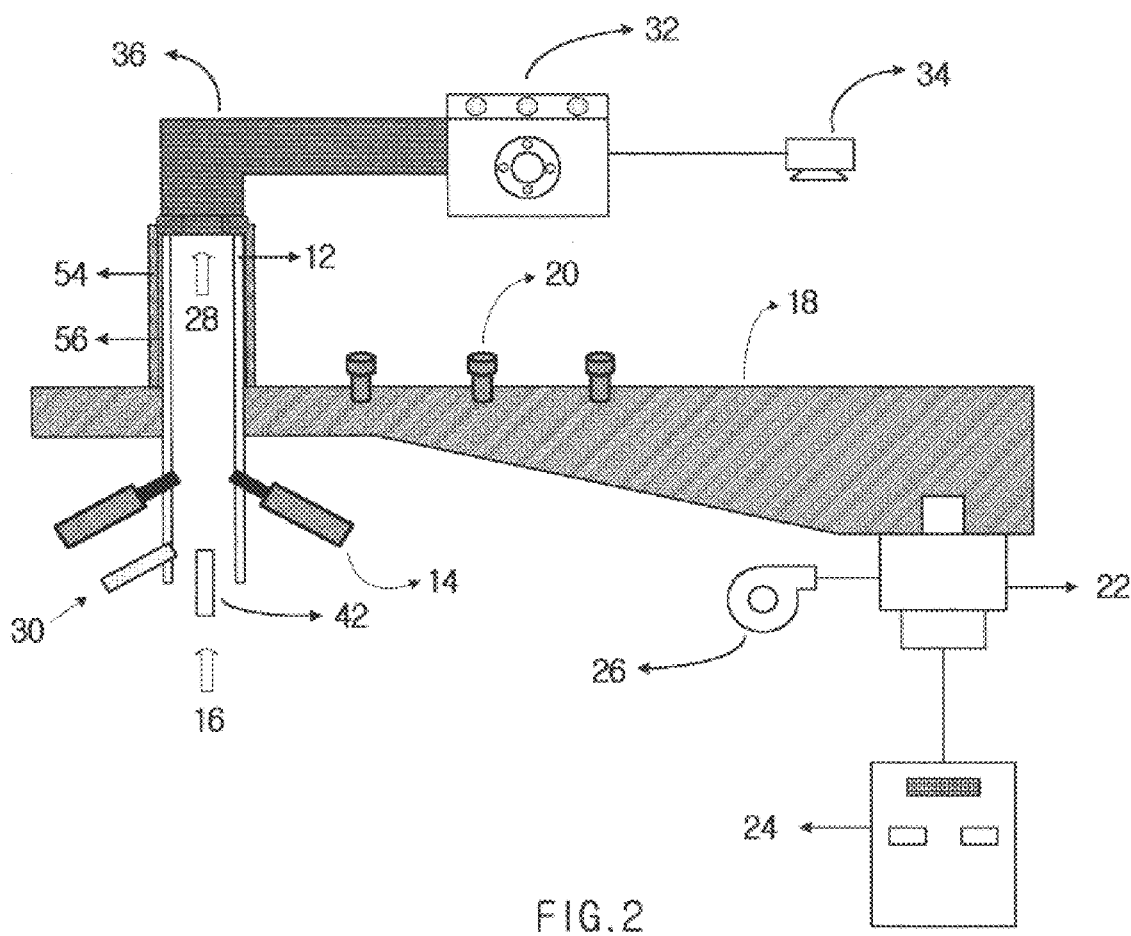
FIG. 2 is a cross-sectional view of the overall microwave torch system.

A cross-sectional view of the overall microwave torch system (10) is presented in FIG. 2. The quartz tube (12) representing the discharge tube is the centerpiece of the present invention. The side view of the waveguide (18) represented by the shaded region in FIG. 2 is tapered to effectively deliver the microwave radiation into the discharge tube (12). The center axis of the discharge tube (12) is located one-quarter wavelength from the rightmost end of the waveguide (18). The distance between the stubs of the three-stub tuning device (20) is again a quarter wavelength. The microwave radiation power can be maximized at the discharge tube by adjusting the depth of the stubs in the three-stub tuning device. A bellows (36), a flexible stainless tube, connects the cylindrical copper tube (54) and the buffer chamber (32).

Figure 3:
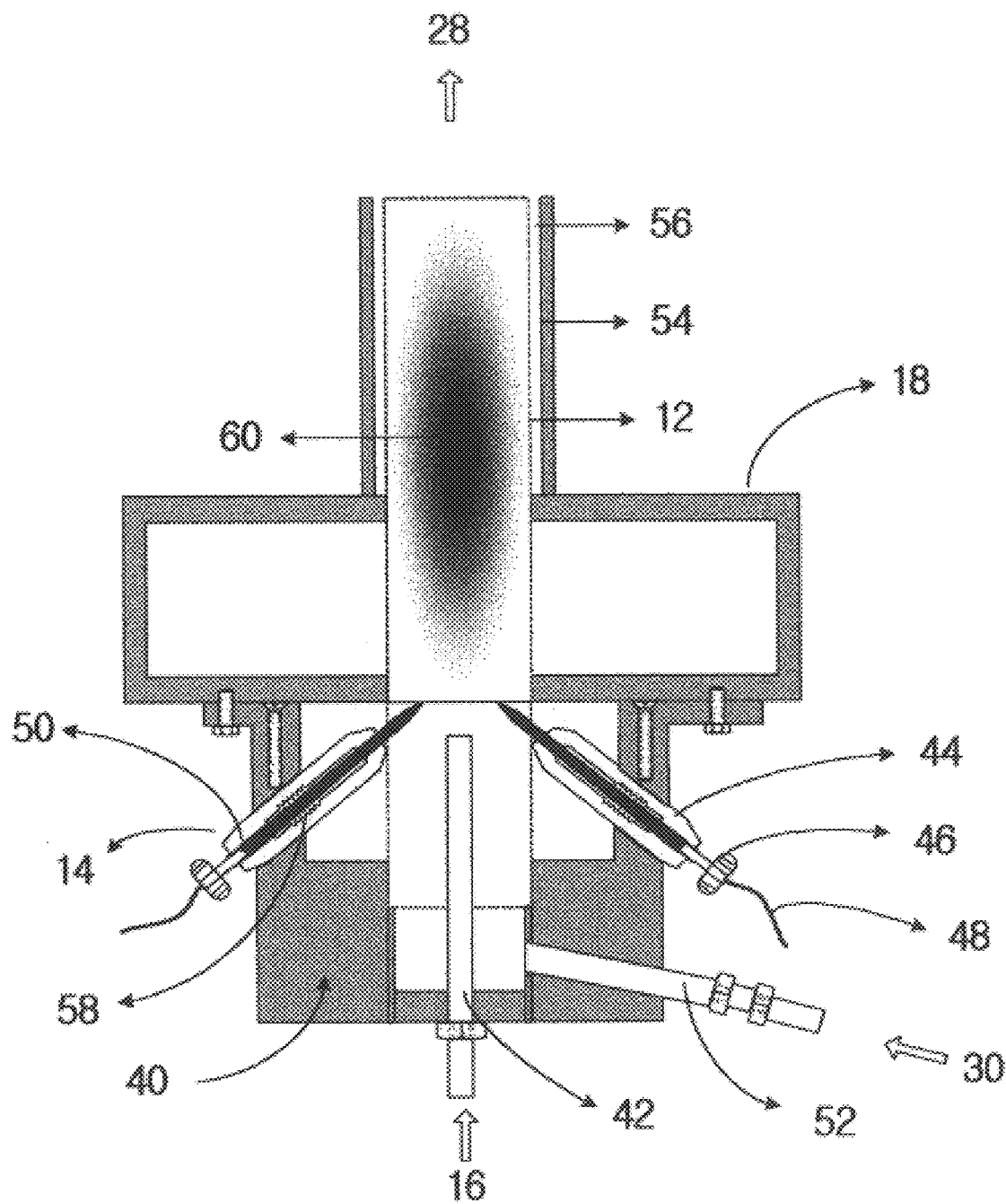
FIG. 3 is a side cross-sectional view of the reaction chamber system labeled by number 10 in FIG. 1.

FIG. 3 shows a side cross-sectional view of the reaction chamber system (10) in FIG. 1. The plasma torch flame (60) is generated by the electrical breakdown of the waste gas by the strong electric field concentrated on the spot. A cylindrical copper tube (54) is set up on the waveguide (18) to shield any leakage of microwaves and to protect the discharge tube (12) from any impact outside. The 5 mm gap (56) between the inner wall of the cylindrical copper tube (54) and the outside wall of the quartz discharge tube (12) prevents the copper tube (54) from damage by heat radiation of the plasma torch flame (60). The contaminated waste gas (16) is injected through the stainless pipeline (42), which guides the waste gas into the center part of the torch flame (60). The swirl gas (30) is injected through the stainless pipeline (52), entering the discharge tube sideways, creating a vortex inside the discharge tube (12), stabilizing the torch flame (60) and protecting the discharge tube (12) from heat radiated by the flame (60). Moreover, the additive gases can be a part of the swirl gas (30), entering through the stainless pipeline (52), mixing with the torch flame (60) and enhancing the oxidation process of the waste gas. The quartz holder (40) made of brass holds the discharge tube (12) indicated by dotted lines in FIG. 3. The igniter (14) consists of the tungsten electrode (50) and the ceramic tube (44), which insulates the tungsten electrode (50) from the quartz holder (40) and the electrode supporter (58). The Teflon cap (46) in the igniter unit (14) is useful to control and replace the tungsten electrode (50). The power line (48) of the igniter (14) is attached to the tungsten electrode (50).

PFC gases are most often used in the semiconductor industry, where they are used in a vacuum chamber and pumped out through a vacuum pump operated by nitrogen gas. Thus, the base gas of the PFC contaminants is nitrogen. A typical vacuum pump in the semiconductor industry discharges 5 liters per minute (lpm) of nitrogen gas contaminated with 20 sccm (0.02 lpm) PFC gas. In the present case, nitrogen gas contaminated with tetrafluoromethane (CF4) is used as the input gas, to demonstrate the destruction of PFC contaminants by the microwave plasma torch. The flow rate of the CF4 gas is controlled by a mass-flow controller (MFC), not shown in figures. The concentration of CF4 is measured in the output gas after the contaminated gas passes through the plasma torch flame in the discharge tube (12). $CF_4$ gas is the most stable contaminant in the PFC gas family, therefore if this invention destroys $CF_4$ contaminants, it will certainly destroy any other PFC contaminants.

Figure 4:
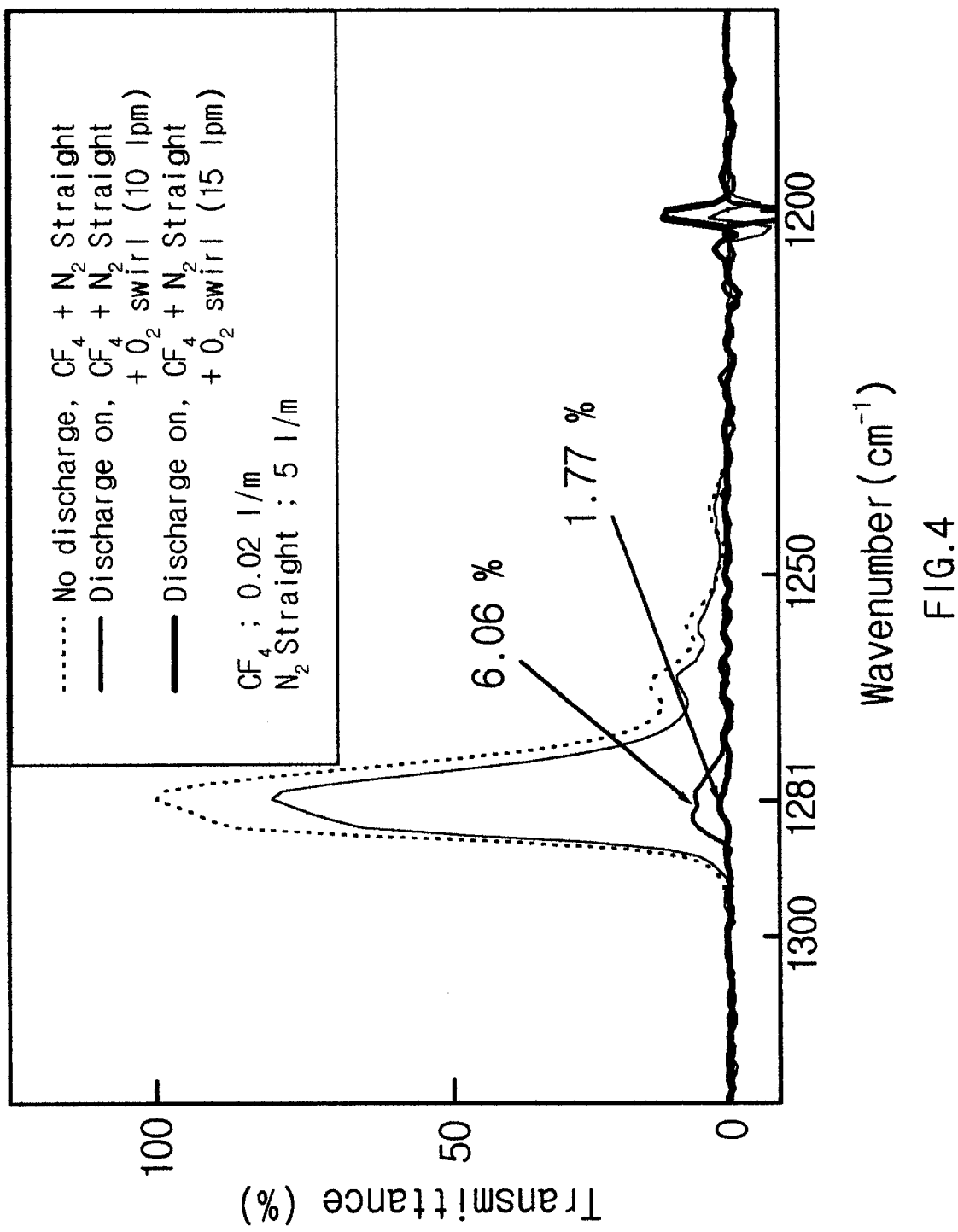
FIG. 4 is the transmittance of the CF4 gas measured by the Fourier-Transform Infrared System (FTIR)
Figure 5:
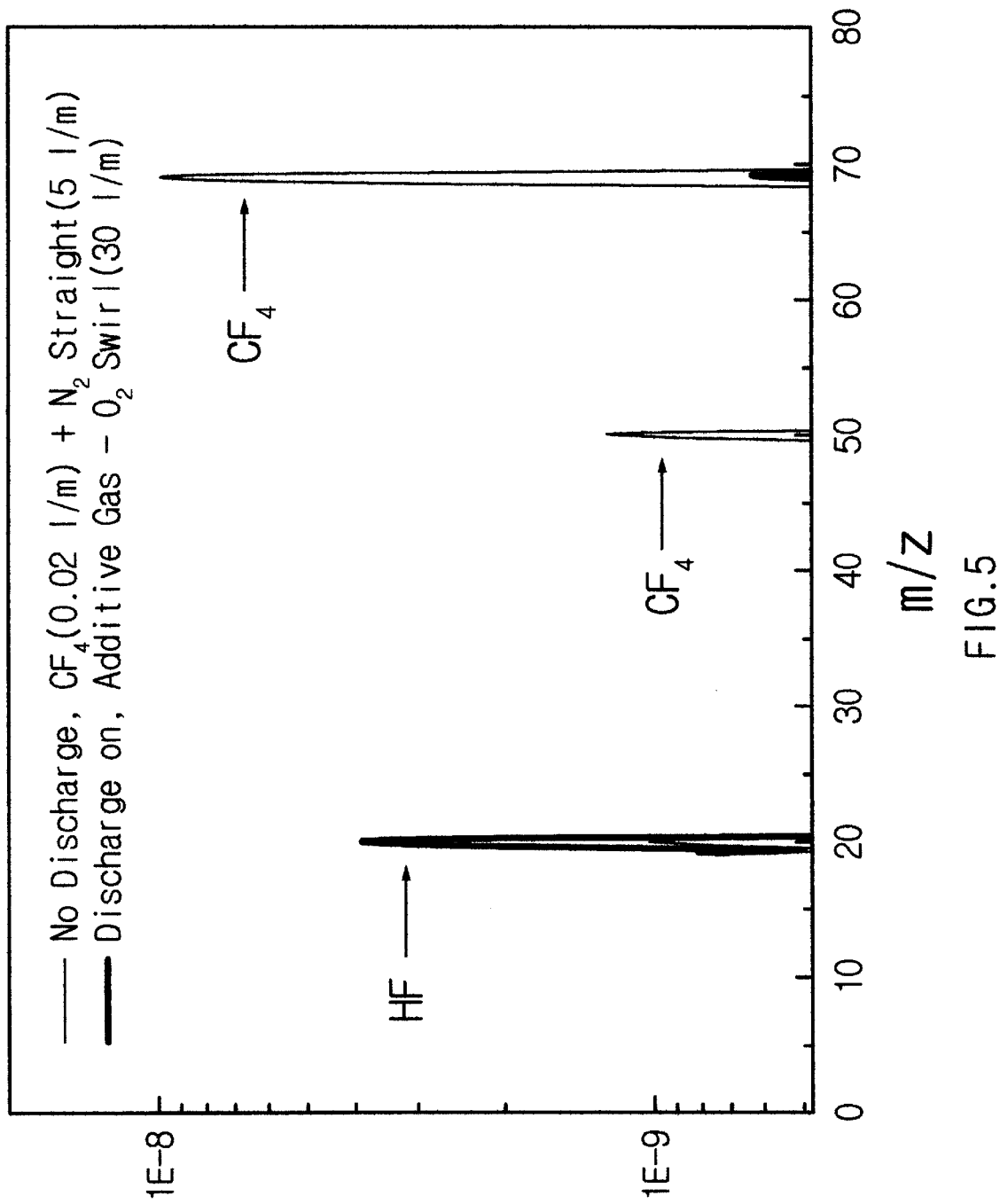
FIG. 5 is the quadruple mass spectrometer (QMS) data before and after the microwave discharge.

Experimental results are now presented in FIGS. 4 and 5, which show the infrared transmittance spectrum and the mass spectrum. Shown in FIG. 4 is the transmittance of the $CF_4$ gas measured by a Fourier-Transform Infrared System (FTIR). The FTIR used in the experiment has the model number of Paragon 1000-pc, which is manufactured by Perkin Elmer Corporation, Norwalk, Conn. in U.S.A. The wavenumber 1281 cm−1 in the horizontal line represents the signature of the $CF_4$ concentration. Five lpm of nitrogen gas mixed with 20 sccm of $CF_4$ gas is used as the input gas in this test. One hundred percent of the $CF_4$ contaminants are transmitted through the discharge tube without electrical discharge. Most of the $CF_4$ contaminants are destroyed by a plasma torch flame generated by 1 kW microwave radiation. The $CF_4$ contaminants are destroyed further by adding more oxygen swirl gas. The FTIR data in FIG. 4 indicates that $CF_4$ contaminants are almost completely eliminated by the microwave torch with 15 lpm of oxygen swirl gas. Quadruple mass spectrometer (QMS) data is shown in FIG. 5 where $CF_4$ concentration before and after the microwave discharge is measured. The QMS used for the experimental data in FIG. 5 has the model number of AccuQuad™ RGA, manufactured by Kurt J. Lester Co., Clairton, Pa. USA The horizontal line m/z represents the mass to charge ratio. The most dominant species in the concentration are the nitrogen and oxygen molecules. However, the most interesting concentration is the $CF_4$ species. FIG. 5 shows the concentrations of the $CF_4$ and its related species. The thin lines represent the concentration before the microwave discharge and the thick lines represent the concentration after the microwave discharge. The QMS data also indicates the almost complete destruction of the $CF_4$ gas with an appropriate amount of oxygen swirl gas. Concentration of the hydrogen fluoride (HF), a byproduct of $CF_4$ destruction, increases after the microwave discharge.

Figure 6:
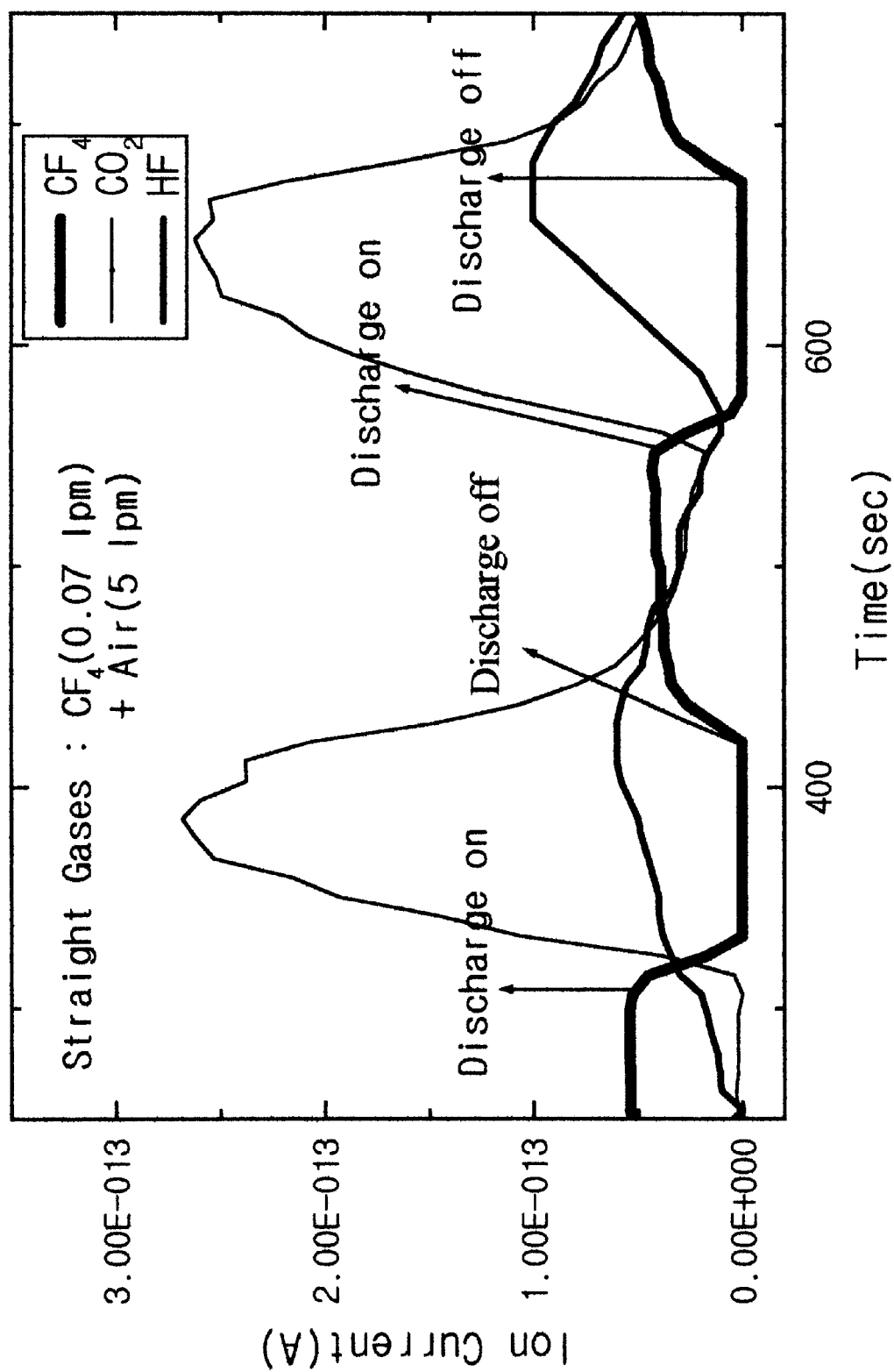
FIG. 6 is the quadruple mass spectrometer (QMS) data. The data is measured in terms of the ion current intensity of CF4 and other by-product versus time marked by discharge on and off.

The other experimental results of QMS analysis are presented in FIG. 6, which shows the ion current intensity versus time. The QMS system used for the experimental data in FIG. 6 is the Balzers QME200, which has the accuracy of 3/100. The measurement range of the mass to charge ratio is from 0 to 200. This QMS system is manufactured by Balzers Aktiengesellschaft, Furstentum Liechtenstein, Germany. The 0.07 lpm of $CF_4$ gas is mixed with 5 lpm of compressed air and is injected into the reaction chamber system as a straight gas. This compressed air is a typical ordinary air consisted of nitrogen, oxygen, water, carbon monoxide and dioxide, etc. FIG. 6 shows the concentration change of $CF_4$ before and after the microwave discharge, and the concentration change of by-products generated after discharge. Remember that there is a substantial concentration of the carbon dioxide in air. Therefore, the carbon dioxide curve ($CO_2$) in FIG. 6 represents the net increase of the carbon-dioxide molecules during the microwave discharge. The efficiency of the $CF_4$ destruction is more than 95 percent. The dissociation of $CF_4$ may produce carbon and fluorine atoms, which may form the carbon dioxide and hydrogen fluoride (HF). The carbon monoxide, methane and water molecules in the compressed air pass through the microwave torch flame, generating various chemical radicals, which may produce the carbon dioxide and hydrogen fluoride by associating with the remnants of $CF_4$ dissociation in the flame. FIG. 6 clearly indicates that the $CF_4$ molecules are destroyed during the microwave discharge, creating additional $CO_2$ molecules and forming HF molecules. These experimental data are obtained from the plasma torch flame generated by the 1 kW output power of a magnetron (22).

Although this embodiment is the device for elimination of the surface cleaning gases emitted from a typical semiconductor industrial process, the invention is not limited to the use of the destruction of perfluorocompound gases. Without departing from the spirit of the invention, numerous other rearrangements, modifications and variations of the present invention are possible in light of the foregoing teachings. It is therefore to be understood that within the scope of the appended claims, the invention may be practiced otherwise than as specifically described.

What is claimed is:

1. In a process of eliminating contaminants in a waste gas by introduction of microwave energy into the electric field to which the waste gas is exposed, including the steps of:

(a) flowing the waste gas to be purified through a dielectric tube;

(b) creating an intense electric field in the waste gas to be purified by an incident and reflected electromagnetic wave generated by a magnetron in said dielectric tube through a tapered rectangular waveguide;

(c) forming an atmospheric-pressure plasma with the help of an ignition system for purpose of dissociating the waste gas;

(d) oxidizing and recombining the dissociated waste gas by injecting a proper reactive gas as an additive gas, wherein the gas to be oxidized and recombined is the byproduct.

2. In the process according to claim 1, wherein the plasma torch device, under the atmospheric pressure, operating at a flame temperature typically at approximately 5000 degrees Celsius, provides for a compact high temperature heat source.

3. In the process according to claim 1, by using an appropriate gas instead of a waste gas, the process provides a high-temperature plasma environment whereby chemical and gas kinetic research can be conducted.

4. In the process according to claim 1, by using oxygen molecules in air as an oxidant, the process is suitable for eliminating the toxic gases trapped inside an isolated room where toxic materials are produced or handled.

5. In the process according to claim 1, wherein the microwave plasma device is attached to a discharge gas exit of combustion devices thereby eliminating soot and unburned carbon particulate.

6. In the process according to claim 1, wherein the microwave plasma device provides a local heating source by suitably rearranging the exit of the plasma torch.

7. The process according to claim 1, wherein said magnetron is inexpensive, operates at 2.45 GHz and power ranges of 0.6 to 1.4 kw, and is capable of handling at least 10 liters per minute of waste gases with the assistance of auxiliary ignition system.

8. A process for treating a waste gas containing PFC, CFC, HFC and any other gases, said process comprising:

(a) feeding the waste gas as a straight gas in a reaction zone exposed to the electromagnetic waves generated by a magnetron;
(b) creating a plasma torch in said zone exposed to electromagnetic waves whereby said perfluorocompounds are substantially converted to oxidation products or excited chemical species; and
(c) feeding simultaneously an additive gas as a swirl gas; and
(d) using a part of the additive gas as radical species associated with the excited chemical species in the zone of the plasma torch
(e) using the other part of the additive gas as cooling agent of said zone by forming a vortex flow.

9. The process according to claim 8 wherein the mixing of a waste gas and an additive gas is formed in a discharged tube.

10. The process according to claim 8, wherein said magnetron is inexpensive, operates at 2.45 GHz and a power range of 0.6 to 1.4 KW, and is capable of handling at least 10 liters per minutes of waste gases with the assistance of an auxiliary ignition system.

* * * * *